Figure 1:
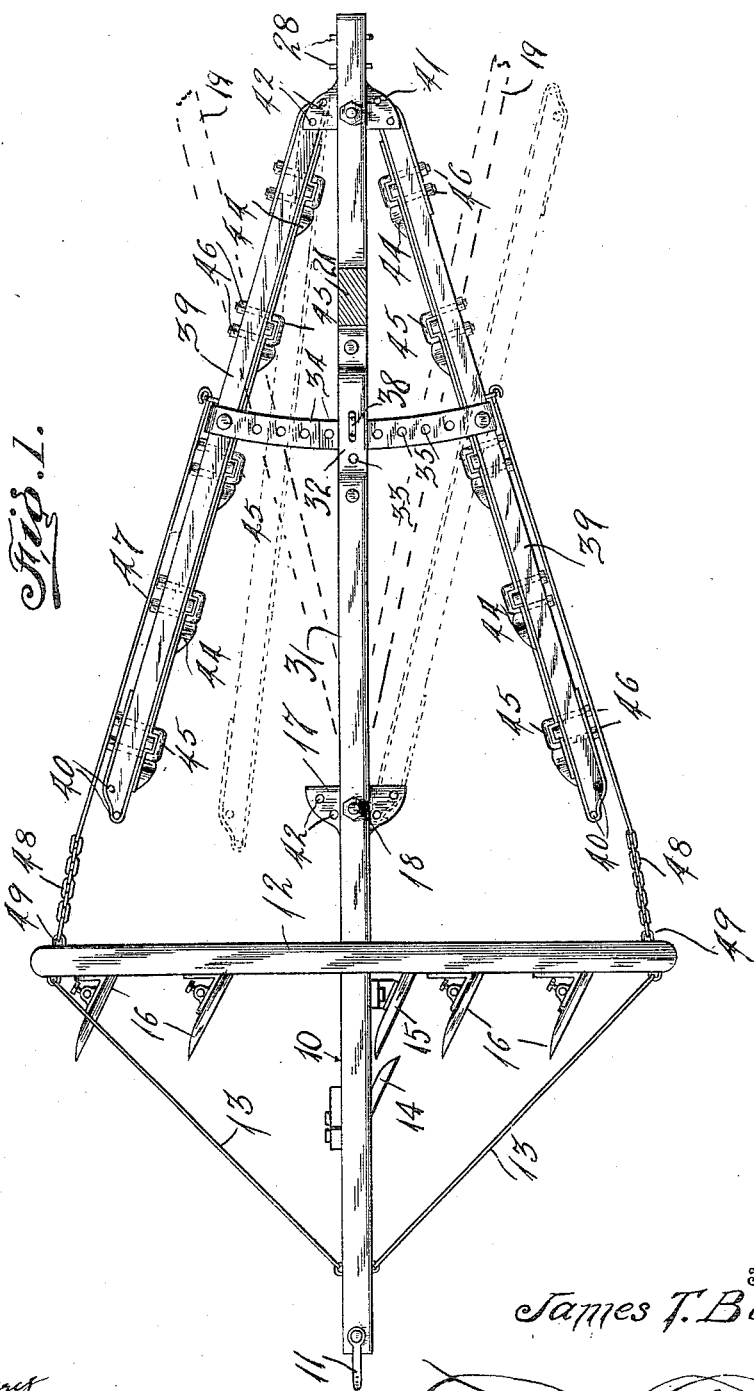

J. T. BOYD.
COMBINATION PLOW AND HARROW.
APPLICATION FILED JULY 21, 1909.

971,592.

Patented Oct. 4, 1910
3 SHEETS—SHEET 1.

Witnesses
Jos Gregory
L. N. Gillis

Inventor
James T. Boyd.
By Chandler & Chandler
Attorneys

J. T. BOYD.
COMBINATION PLOW AND HARROW.
APPLICATION FILED JULY 21, 1909.
971,592.
Patented Oct. 4, 1910.
3 SHEETS—SHEET 2.
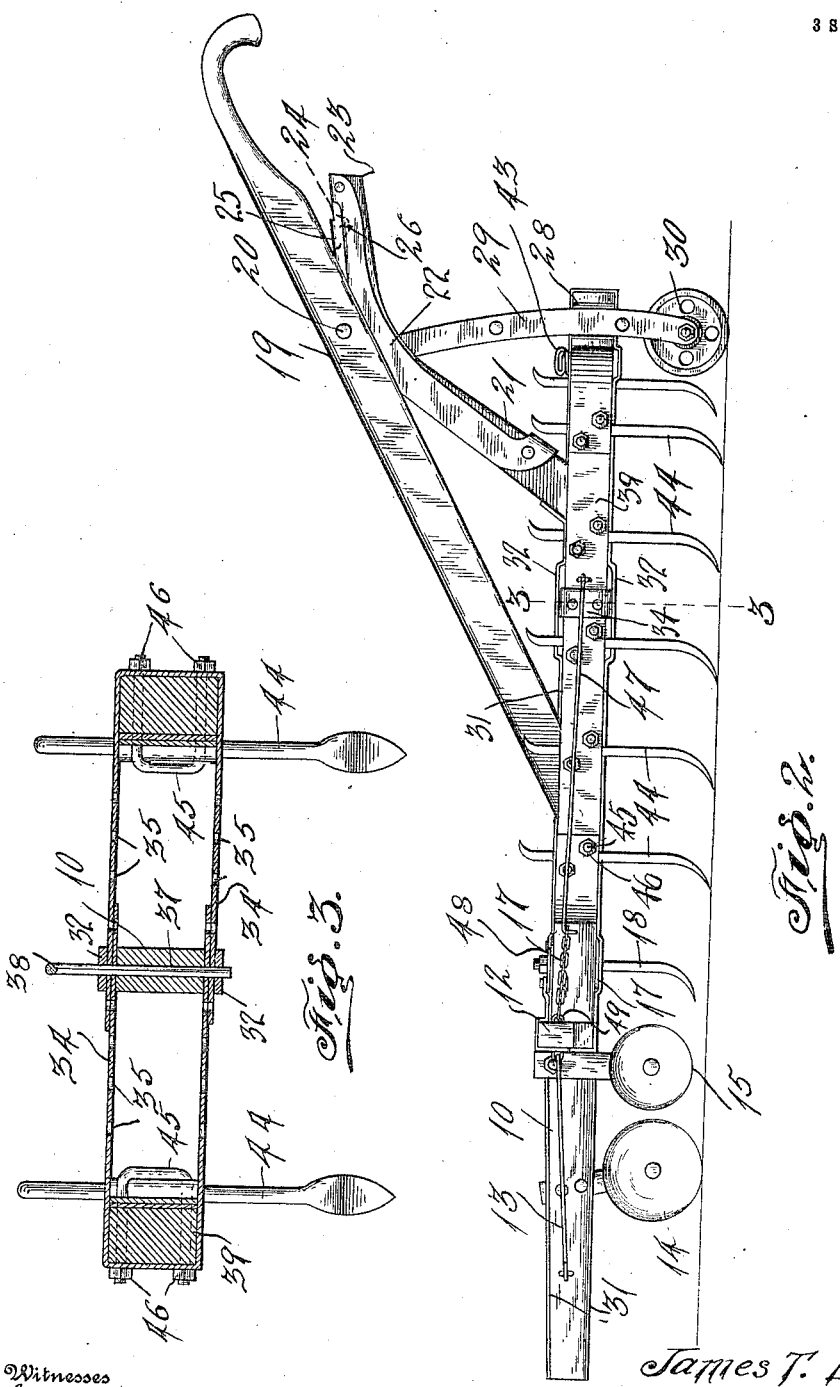
Witnesses
Jos. Gregory.
L. N. Gillis.
Inventor
James T. Boyd.
By 
Attorneys

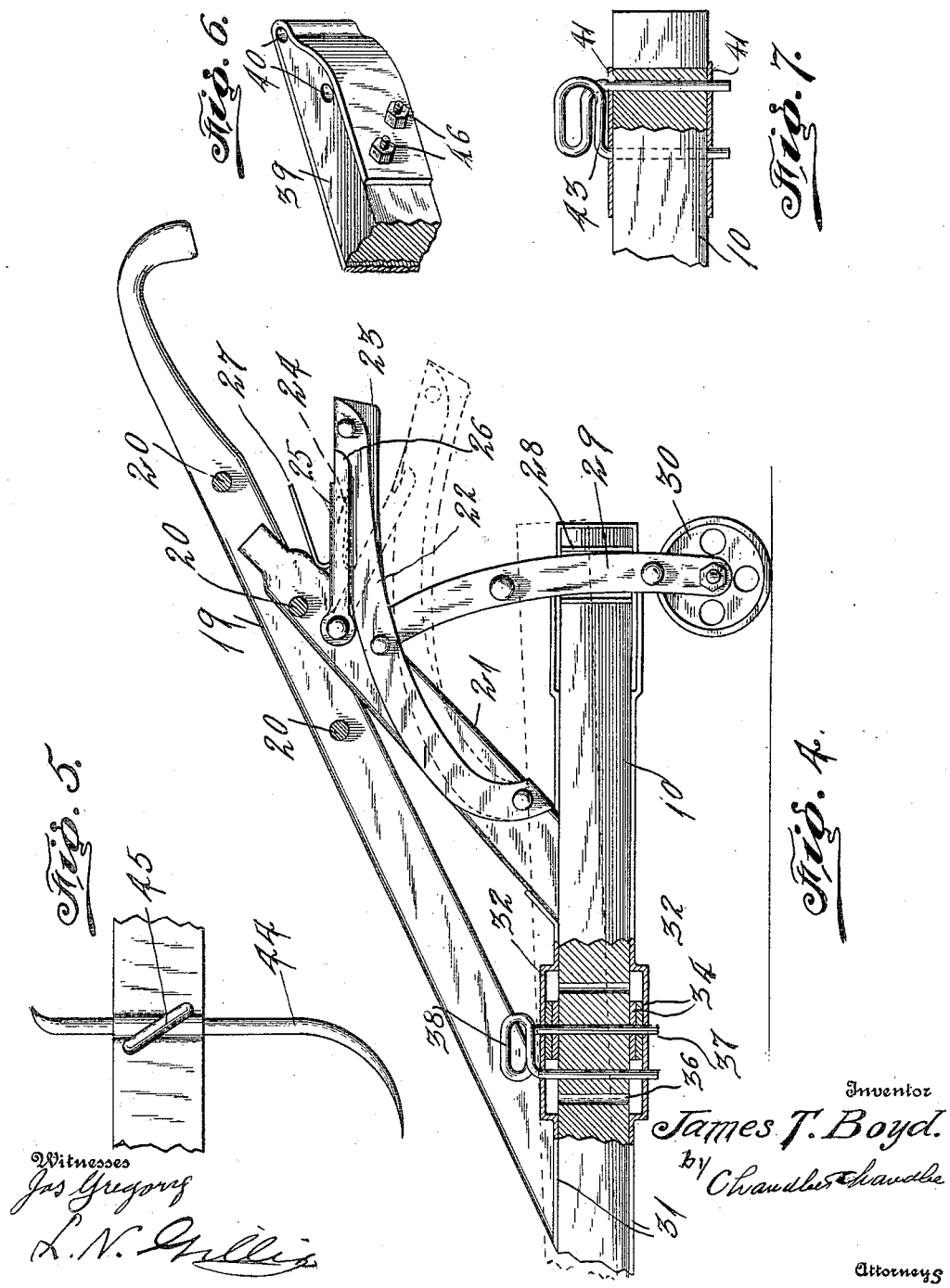

UNITED STATES PATENT OFFICE.

JAMES T. BOYD, OF SPRINGVILLE, MISSISSIPPI.

COMBINATION PLOW AND HARROW.

971,592.   Specification of Letters Patent.   Patented Oct. 4, 1910.

Application filed July 21, 1909. Serial No. 508,792.

*To all whom it may concern:*

Be it known that I, JAMES T. BOYD, a citizen of the United States, residing at Springville, in the county of Pontotoc, State of Mississippi, have invented certain new and useful Improvements in Combination Plows and Harrows; and I do hereby declare the following to be a full, clear, and exact description of the invention, such as will enable others skilled in the art to which it appertains to make and use the same.

This invention relates to agricultural implements and has special reference to a form of combined plow and harrow.

One object of the invention is to provide an improved general construction of devices of this character.

Another object of the invention is to provide an improved form of frame for supporting earth working implements.

A third object of the invention is to provide a form of frame having certain members capable of being adjusted at various angles to and in different relation to the remainder of the frame members.

A fourth object of the invention is to provide an improved securing means for the members when so adjusted.

With the above and other objects in view, as will be hereinafter apparent, the invention consists in general of an improved form of frame supporting earth working implements together with an improved adjusting mechanism for portions of the frame.

The invention further consists in certain novel details of construction and combinations of parts hereinafter fully described, illustrated in the accompanying drawings, and specifically set forth in the claims.

In the accompanying drawings, like characters of reference indicate like parts in the several views, and Figure 1 is a top plan view of a plow and harrow constructed in accordance with this invention. Fig. 2 is a side elevation thereof. Fig. 3 is an enlarged detail section on the line 3—3 of Fig. 2. Fig. 4 is an enlarged detail view of the mechanism whereby the rear end of the plow is raised or depressed. Fig. 5 is a view of a portion of the inside of one of the frame members showing the manner of securing an earth working tool. Fig. 6 is a detail perspective view of one end of one of the movable frame members. Fig. 7 is a detail view showing the improved means for holding the ends of the members in adjustment and the application thereof.

The numeral 10 indicates the main longitudinal frame member, the forward end of which constitutes a tongue whereto is connected a clevis 11 for the purpose of attaching draft animals.

Extending transversely of the member 10 and well toward the front thereof is a transverse frame member 12 and the frame members 12 and 10 are rigidly secured together and are braced against movement relative one to the other by means of fixed brace rods 13, the ends whereof are securely attached to the members 10 and 12 respectively.

Fixedly secured to the member 10 in advance of the member 12 is a colter 14 which consists of a revolving disk adapted to enter the soil. Behind this colter on the member 10 is a second colter 15 of like character and supported on the member 12 are other colters 16. These colters act together to divide the soil into a plurality of strips as the device is drawn along through the field.

Secured upon the member 10 are top and bottom plates 17 and extending through these plates is a cultivator tooth 18 which thus lies in the space between the colters 14 and 15 and to the rear thereof.

Secured to the member 10 are handles 19 which are spread apart at their rear ends and which are connected by means of suitable braces 20. Extending downward from one of the braces 20 and connected at its lower end to the member 10 is a strut 21. Pivoted upon the strut 21 are arms 22 which carry between their free ends a spacing member 23 which serves to hold the arms 22 apart and is provided with a notch 24 adapted to receive the free end of a pawl 25 which is pivotally mounted on the strut 21. This pawl is of peculiar character and consists of a plate of metal bent to channel shape and having the web cut away at one end to form guide portions 26. The web is also cut away at the opposite end and rebent to form a handle portion 27. The spacing member 23 also acts as a handle for the purpose of moving the bars 22 up and down around the pivots.

Fixed upon the rear end of the member 10 are guides 28 and connected to the arms 22 and depending downwardly therefrom are bars 29 which are spaced apart and held to move between the guides 28. Between the lower ends of these bars 29 is rotatably mounted a ground wheel 30 and by means of this ground wheel the depth of cut of the implement may be adjusted. The manner of adjusting this ground wheel is simply by grasping the member 23 by its rear end, this end serving as a handle, and pressing downward thereon. This raises the opposite ends of the members 22, lifts the strut 21 and attached beam 10, and causes the parts to assume the position shown in dotted lines in Fig. 4.

The member 10 is covered with top and bottom plates 31 which have portions thereof offset from the member as indicated at 32 and these offset portions are provided with openings 33 for purposes hereinafter to be described. Slidably mounted in the spaces between the offset portions 32 and the member 10 are U-shaped bars 34 provided each with a series of spaced perforations 35. The frame member 10 is also provided with perforations 36 and in order to hold these U-shaped bars in adjusted position there is received within one of the perforations of the frame member and the opposed perforations in the portions 32 a leg 37 of a locking pin formed by bending a rod so that there is formed a U-shaped lower portion provided with a handle portion 38. Between the bases of the U-shaped members 34 are held frame members 39 each of which is provided adjacent each end with spaced perforations 40.

Adjacent the rear end of the member 10 are upper and lower plates 41 similar to the plates 17 and each of these plates 41 and 17 is provided with spaced perforations 42 with which the perforations 40 are adapted to be brought into registry. These parts are held in registry by means of a locking pin 43 similar in all respects to the locking pin previously described, and this locking pin is adapted to be either positioned in the rear plates 41 or in the front plates 17.

Secured along the frame members 39 are a series of cultivator teeth 44 each of which is adjustably secured to one of the members 39 by means of a U bolt 45 which extends through the frame member and is provided on its outer face with nuts 46 for the purpose of tightening the U bolt and holding the respective tooth 44 in adjusted position. These U bolts are so arranged that stress brought on the lower end of the tooth 44 will cause said tooth to bear against one side of the U bolt adjacent the bottom of the member 10 and the other side of the U bolt adjacent the top of said member, this construction being best seen from reference to Fig. 5.

In the operation of this device as the implement is drawn through the field the various rotary cultivators cut the ground into strips and this is then pulverized by means of the series of cultivator teeth arranged along the members 39. It is to be observed that varying arrangements may be made of the position of these members as can readily be seen from an inspection of Fig. 1 where the members are shown in full lines in one position and each member is shown in dotted lines in a second position, the latter being different.

By means of this construction an indefinite number of changes can be secured with the result that varying grades of soil may be worked to a maximum advantage.

For the purpose of resisting the stresses brought upon the members 34 brace rods 47 are attached to the respective members adjacent their point of attachment to the U-shaped spacing members and these brace rods each has at its forward end a chain 48 adapted to have one of its links engaged with a hook 49 fixedly supported on the member 12.

There has thus been provided a simple and efficient device of the kind described and for the purpose specified.

Having thus described the invention, what is claimed as new, is:—

1. In a device of the kind described, a frame including a fixed longitudinal member and a transverse member secured to the fixed member, a movable member, a bar connecting the fixed member to the movable member intermediate its ends, said bar being provided with a plurality of bolt receiving apertures, a bolt adapted to be positioned through one of said apertures and the longitudinal fixed member, coacting means on the longitudinal fixed member and the ends of the movable member to secure either end of the movable member to the fixed member, and braces connecting the movable member to the fixed member.

2. In a device of the kind described, a frame including a fixed longitudinal member and a transverse member secured to the fixed member, a movable member, a bar connecting the fixed member to the movable member intermediate its ends, said bar being provided with a plurality of bolt receiving apertures, a bolt adapted to be positioned through one of said apertures and the longitudinal fixed member, coacting means on the longitudinal fixed member and the ends of the movable member to secure either end of the movable member to the fixed member, braces connecting the movable member to the fixed member, and earth working tools carried on said members.

3. In a device of the kind described, a frame including a fixed longitudinal member and a transverse member secured to the fixed member, a movable member, a bar connecting the fixed member to the movable member intermediate its ends, said bar being provided with a plurality of bolt receiving apertures, a bolt adapted to be positioned through one of said apertures and the longitudinal fixed member, coacting means on the longitudinal fixed member and the ends of the movable member to secure either end of the movable member to the fixed member, braces connecting the movable member to the fixed member, earth working tools carried on said members, and a ground wheel adjustably mounted at the rear of said fixed member.

4. In a device of the kind described, a frame including a fixed longitudinal member, a pair of bars extending laterally from said member, said bars being connected together and to the member by a common pivot, a transverse member fixed across said longitudinal member, chains connected to the ends of said transverse member, movable members pivoted at the outer ends of said bars, a brace rod pivoted to each of said movable members and provided with a hooked end, said hooked ends being adapted to engage in one of the links of said chains whereby the positions of said bars may be adjusted with regard to their angular relation to the longitudinal member.

5. In a device of the kind described, a frame including a fixed longitudinal member, a pair of bars extending laterally from said member, said bars being connected together and to the member by a common pivot, a transverse member fixed across said longitudinal member, chains connected to the ends of said transverse member, movable members pivoted at the outer ends of said bars, a brace rod pivoted to each of said movable members and provided with a hooked end, said hooked ends being adapted to engage in one of the links of said chains whereby the positions of said bars may be adjusted with regard to their angular relation to the longitudinal member, and means to connect either end of each of said movable members to said longitudinal member.

In testimony whereof, I affix my signature, in presence of two witnesses.

JAMES T. BOYD.

Witnesses:
  H. T. CALDWELL,
  R. P. WILSON.